United States Patent
Knox et al.

[11] Patent Number: 5,833,360
[45] Date of Patent: Nov. 10, 1998

[54] HIGH EFFICIENCY LAMP APPARATUS FOR PRODUCING A BEAM OF POLARIZED LIGHT

[75] Inventors: Richard M. Knox; Dale S. Walker, both of Houston; William Burton Mercer, Spring, all of Tex.

[73] Assignee: Compaq Computer Corporation, Houston, Tex.

[21] Appl. No.: 747,190

[22] Filed: Nov. 12, 1996

Related U.S. Application Data

[63] Continuation-in-part of Ser. No. 730,818, Oct. 17, 1996.
[51] Int. Cl.⁶ .................................. F21V 9/08; F21V 9/14
[52] U.S. Cl. ........................... 362/293; 362/19; 362/263; 362/298; 313/112; 313/113; 313/234; 313/584; 313/607
[58] Field of Search ..................................... 313/112, 234, 313/607, 113, 160, 161, 584; 315/248, 344; 362/19, 263, 293, 298; 359/352, 359, 502, 589

[56] References Cited

U.S. PATENT DOCUMENTS

| | | | |
|---|---|---|---|
| 2,974,243 | 3/1961 | Marrison | 313/161 |
| 3,860,854 | 1/1975 | Hollister | 313/607 |
| 4,020,336 | 4/1977 | Linder | 362/19 |
| 4,095,881 | 6/1978 | Maddox | 362/293 |
| 4,368,292 | 1/1983 | Rothwell et al. | 313/112 |
| 4,612,604 | 9/1986 | Schlyter | 362/19 |
| 4,799,137 | 1/1989 | Aho | 362/309 |
| 4,872,741 | 10/1989 | Dakin et al. | 313/607 |
| 4,874,228 | 10/1989 | Aho et al. | 349/62 |
| 5,054,885 | 10/1991 | Melby | 359/618 |
| 5,083,857 | 1/1992 | Hornbeck | 359/291 |
| 5,122,905 | 6/1992 | Wheatley et al. | 359/586 |
| 5,122,906 | 6/1992 | Wheatley | 359/586 |
| 5,148,157 | 9/1992 | Florence | 345/84 |
| 5,190,370 | 3/1993 | Miller et al. | 362/340 |
| 5,220,236 | 6/1993 | Washburn et al. | 313/607 |
| 5,225,823 | 7/1993 | Kanaly | 345/89 |
| 5,233,385 | 8/1993 | Sampsell | 355/35 |
| 5,313,479 | 5/1994 | Florence | 372/26 |
| 5,381,309 | 1/1995 | Borchardt | 362/31 |
| 5,404,076 | 4/1995 | Dolan | 313/572 |
| 5,404,171 | 4/1995 | Golstein et al. | 348/459 |
| 5,412,289 | 5/1995 | Thomas et al. | 313/160 |
| 5,416,618 | 5/1995 | Juday | 359/53 |
| 5,453,859 | 9/1995 | Sannohe et al. | 359/63 |
| 5,467,146 | 11/1995 | Huang et al. | 348/743 |
| 5,471,584 | 11/1995 | Blaxtan et al. | 359/263 |
| 5,486,949 | 1/1996 | Schrenk et al. | 359/498 |
| 5,504,391 | 4/1996 | Turner et al. | 313/570 |
| 5,508,841 | 4/1996 | Lin et al. | 359/318 |
| 5,523,881 | 6/1996 | Florence et al. | 359/561 |
| 5,555,324 | 9/1996 | Waxman et al. | 382/254 |
| 5,606,220 | 2/1997 | Dolan et al. | 313/637 |
| 5,612,820 | 3/1997 | Schrenk et al. | 359/498 |
| 5,626,800 | 5/1997 | Williams et al. | 264/1.38 |
| 5,642,129 | 6/1997 | Zavracky et al. | 345/100 |
| 5,670,842 | 9/1997 | Dolan et al. | 313/570 |
| 5,682,080 | 10/1997 | Dolan et al. | 313/570 |
| 5,686,793 | 11/1997 | Turner et al. | 313/570 |

OTHER PUBLICATIONS

"Chapter 8—Liquid Crystal Displays," pp. 181–251.
"Optics for Image Disposition Systems", Nitto Optical Co., Ltd, p. 9.

(List continued on next page.)

*Primary Examiner*—Alan Cariaso
*Attorney, Agent, or Firm*—Arnold, White & Durkee

[57] ABSTRACT

An electrodeless lamp apparatus of high efficiency employs a reflection system that allows the lamp to reabsorb light energy. The energy is redirected back to the light to provide increased system efficiency. The redirected light is of the wrong polarization and/or wrong parts of the color spectrum. The lamp efficiency is increased because of the optical pumping as well as the reuse (after some downshifting) of the returned light. In one embodiment, a projection system provides an image source or projection engine that includes the improved high efficiency lamp of the present invention.

55 Claims, 4 Drawing Sheets

OTHER PUBLICATIONS

Baur, T. et al., "High Performance Liquid Crystal Device Suitable for Projection Display," SPIE vol. 2650, pp. 226–228 (Jul. 1996).

Displaytech, Inc., "FLC/VLSI Display Technology" (Dec. 1, 1995).

Gambogi, W., et al., "HOE Imaging in DuPont Holographic Photopolymers," Proc. SPIE, Diffractive and Holographic Optics Technology, vol. 2152 (1994).

Gambogi, W.J. et al., "Advances and Applications of DuPont Holographic Photopolymers," Optics Quebec '93, Conf. 2043, Holographic Imaging and Materials (Aug. 1993).

Gambogi, W.J. et al., "Color Holography Using DuPont Holographic Recording Films," Proc. SPIE, Holographic Materials, vol. 2405 (Feb. 1995).

Gambogi, W.J. et al., "Diffractive Printing Methods Using Volume Holograms," IS&T/SPIE 1993 Int'l Conf. on Electronic Imaging, conf. 1914 (1993).

Gambogi, W.J. et al., "Holographic Transmission Elements Using Improved Photopolymer Films," SPIE vol. 1555 Computer and Optically Generated Holographic Optics (Fourth in a Series), pp. 256–266 (1991).

Bennett, Jean M., Handbook of Optics, vol. II, Devices, Measurements, and Properties, "Chapter 3—Polarizers" (1995).

Jack. M. Younse, "Projection Display Systems Based on the Digital Micromirror Device (DMD)," SPIE Proceedings Reprint, vol. 2641, pp. 64–75 (Jul. 1995).

Joubert, C. et al., "Dispersive Holographic Microlens Matrix for Single LCD Projection." (Mar. 1996). SPIE, vol. 2650, pp. 243–252.

Larry J. Hornbeck, "Digital Light Processing and MEMS: Timely Convergence for a Bright Future," presented at Micromachining and Microfabrication '95 (Oct. 23–24, 1995).

Parfenov, A.V. and Putilin, A.N., "Advanced Optical Schemes with Liquid Crystal Image Converters for Display Applications," SPIE vol. 2650, pp. 173–179 (Jul. 1996).

Tipton, D. et al., "Improved Process of Reflection Holography Replication and Heat Processing," Proc. SPIE, Practical Holography VIII, Materials and Processing, vol. 2176 (Feb. 1994).

Weber, A.M. et al., "Hologram Recording in DuPont's New Photopolymer Materials," Practical Holography IV, SPIE OE/Lase Conference Proceedings, 1212–04 (Jan. 1990).

Website: Applications of PDLCs http://abalone.cwru.edu/tutorial/enhanced/files/pdlc/apps/apps.html (Sep. 1996).

Website: New Flat Panel Display Technologies http://mambo.ucsc.edu/psl/cis_seminars/119610/19961017.html (Oct. 1996).

Website: Polymer Dispersed Liquid Crystals http://www.bell–labs.com/new/gallery/pdlc.html1 (Sep. 1996).

Website: Polymer–dispersed LCDs http://stefan.www.media.mit.edu/people/st...ls/node9.htm (May 1995).

Website: Worldwide Flat Panel Display Markets and Trends http://www.electronictrendpubs.com/fpd.htm (Mar. 1996).

HIGH EFFICIENCY LAMP APPARATUS FOR PRODUCING A BEAM OF POLARIZED LIGHT

RELATED APPLICATIONS

This application is a continuation-in-part of U.S. patent application Ser. No. 08/730,818, entitled "Image Projection System Engine Assembly," filed Oct. 17, 1996, by Richard M. Knox.

BACKGROUND OF THE INVENTION

1. Field of the Invention

The present invention relates to a high power lamp apparatus with high efficiency that produces a beam of polarized light using a lamp bulb containing a fill under pressure that is energized with externally placed electrodes for vaporizing the fill. More particularly, the present invention relates to a high power electrodeless lamp in which light energy is redirected back into the lamp with a reflector to provide increased system efficiency, where the redirected light is of the wrong polarization and/or the wrong parts of the color spectrum for use in the system in which the lamp is implemented. In one embodiment, the present invention relates to a projection system that uses the improved high power lamp of the present invention.

2. Description of the Related Art

Higher power lamps are used for illumination applications beyond typical incandescent and florescent lamps. One type of lamp known as a high intensity discharge (HID) lamp consists of a glass envelope which contains electrodes and a fill which vaporizes and becomes a plasma when the lamp is operated.

Recently, a patent issued for a high power lamp that utilizes a lamp fill containing sulfur or selenium or compounds of these substances. U.S. Pat. No 5,404,076, issued to Dolan et al. and entitled "Lamp Including Sulfur" discloses an electrodeless lamp utilizing a fill at a pressure at least as high as one atmosphere. The fill is excited at a power density in excess of 50 watts per square centimeter. An arc lamp utilizing the fill at a pressure at least as high as one atmosphere is excited at a power density of at least 60 watts per square centimeter. The Dolan et al. U.S. Pat. No. 5,404,076 is incorporated herein by reference.

Projecting systems are used to display images on large surfaces, such as movie or television screens. For example, in a front projection system, an image beam is projected from an image source onto the front side of a reflection-type angle transforming screen, which then reflects the light toward a viewer positioned in front of the screen. In a rear projection system, the image beam is projected onto the rear side of a transmission-type angle transforming screen and transmitted toward a viewer located in front of the screen.

In prior co-pending U.S. patent application Ser. No. 08/581,108, filed Dec. 29, 1995, there is disclosed a method of displaying an optical image by projecting the image along an optical path and at an optical device interposed across the optical path, at one time reflecting the image from the optical device and at a different time permitting the image to pass through the optical device to be displayed. U.S. application Ser. No. 08/581,108, filed Dec. 29, 1995 is incorporated herein by reference.

The image source for a projection system employs a light that must be of high intensity and preferably very efficient. However, in each step of transmission of the light from the lamp to the screen there is some loss of light, resulting in inefficiency. It is desirable that at least some of these inefficiencies be addressed to allow an improvement of system efficiency.

SUMMARY OF THE INVENTION

The present invention provides a high efficiency lamp apparatus that uses light reabsorption for improved efficiency. The present invention also provides a projection system with a projection source or engine that uses a lamp that can reabsorb light energy for increased efficiency. Some of the light energy is redirected back to the light source providing increased system efficiency.

Preferably, an optical device using the lamp can only utilize light of desired polarization and/or desired color for use in the projection system, so the redirected light is of the unneeded polarization and/or the unneeded part of the color spectrum. The lamp efficiency is increased because of an "optical pumping" effect.

With the improved high intensity lamp of the present invention, several variations in reflector placements, both for the polarizing and spectral reflectors, are provided for various projection systems.

The method of the present invention thus provides for intensifying a polarized light beam emitted from an electrodeless lamp. The method includes the powering of a electrodeless lamp with radio frequency energy (or other suitable frequency) that generates a light source within the lamp which produces a light beam.

A reflector is positioned next to the lamp. Some of the unused light emitted by the light source is redirected back to the lamp so that the lamp reabsorbs that light energy. This redirected light can also include ultraviolet and infrared radiation as well as visible radiation. The redirected light is used to increase the efficiency of the light source through an optical pumping effect. Some of the redirected light is of an unusable polarization, so that only light of a usable polarization is passed by the assembly.

The electrodeless lamp can include a bulb with a high or low pressure fill. The bulb fill is extended to a plasma state by radio frequency energy produced by electrodes positioned externally of the bulb. In the preferred embodiment, the fill is a sulfur-selenium, or non-mercury metal halides.

The apparatus of the present invention provides a high efficiency lamp apparatus for producing a beam of light that is polarized and/or of a desired color (or colors). The apparatus includes an electrodeless lamp body or bulb that defines a chamber. A fill is contained within the chamber. Electrodes are positioned externally of the lamp chamber for producing radio frequency energy to excite the fill, thereby forming a plasma light source of intense heat. The electrodes, however, are not subjected to the intense heat generated by the plasma. Alternatively, internal electrodes could be used with some types of non-mercury metal halide fills.

A reflector is positioned next to the lamp body both to direct light from the lamp in a desired direction and for redirecting some of the light emitted by the light source back to the lamp. The lamp reabsorbs this redirected light energy to intensify the light source.

The reflector preferably includes a housing surrounding most of the bulb and a polarizing and/or interference filter (e.g., dichroic reflector) positioned to receive the light beam. The polarizing reflector passes light of one polarity and reflects light of the other. The interference filter passes light of a desired part of the color spectrum.

The bulb is preferably a high temperature tolerant enclosure such as a quartz enclosure having a hollow interior that contains sulfur, selenium, non-mercury metal halide, or like fill that can be excited to form a plasma.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

This application is a continuation-in-part of U.S. patent application Ser. No. 08/730,018, entitled "Image Projection System Engine Assembly," filed Oct. 17, 1996, by Richard M. Knox, which is hereby incorporated by reference in its entirety.

Figure 1:
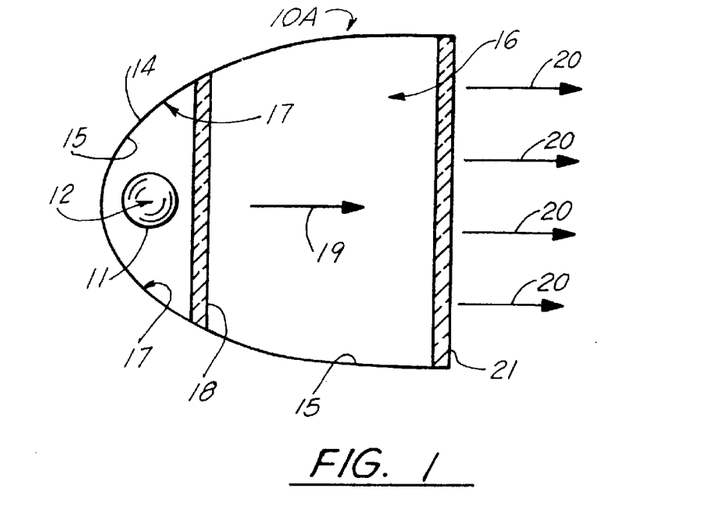
FIG. 1 is a sectional view of the preferred embodiment of the apparatus of the present invention.
Figure 1A:
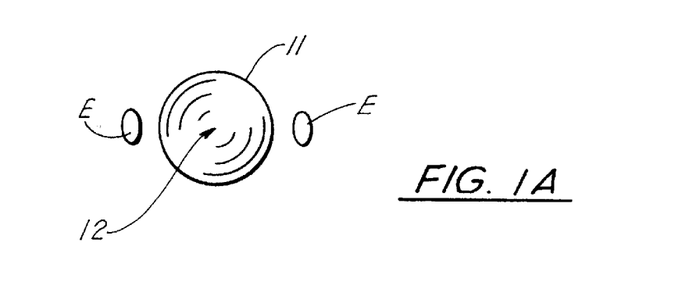
FIG. 1A is a fragmentary view of the preferred embodiment of FIG. 1.

FIG. 1 shows generally the preferred embodiment of the apparatus of the present invention designated generally by the numeral 10A. A high efficiency lamp apparatus 10A includes a bulb 11 having a hollow interior 12 that contains a fill such as sulfur or selenium. The fill can be excited to a plasma state to produce a high intensity light source. In this manner, electrodes E (see FIG. 1A), which provide radio or other suitable frequency energy to excite the fill (preferably 150 MHz to 100 GHz, or other frequency suitable for exciting the fill), are not subjected to the intense heat of the plasma inside bulb 11. Preferably, bulb 11 is based on the teachings and concepts of Dolan, incorporated by reference above. Alternately, bulb 11 can be another type of bulb that reabsorbs and reemits light, such as a non-mercury containing metal halide type lamp (with or without electrodes), or other lamp that can reabsorb and reemit light. The fill may be high or low pressure.

A shaped annular reflector housing 14 can be parabolic, compound parabolic, elliptical, polyellipsoidal, or other conical shapes known in the art and is positioned about and spaced from bulb 11 as shown in FIG. 1. The housing 14 is hollow, defined by a wall 15 and an open end portion 16. The wall 15 has a reflecting surface 17.

A first transversely positioned screen 18 is interposed across the path of a light beam 19 that is travelling from the bulb 11 through the open end partition 16 in the direction of arrows 20. A second screen 21 is interposed across the path 19 and on the opposite side of screen 18 from bulb 11 as shown in FIG. 1.

The first screen 18 is preferably an interference filter (for example, dichroic filter or dichroic mirror) that reflects certain colors of light while allowing others to pass through. The screen 18 is preferably selected to pass desired colors (e.g., RGB or GMY), reflecting unneeded colors back to the bulb 11 and the reflecting surface 17. By reflecting light other than desired colors back to the bulb 11, the apparatus 10 of the present invention becomes more efficient because it allows conversion of redirected light back to useful wavelengths. The redirected light is reemitted with a slight red shift, but this can be compensated for through appropriate filter selection, gamma correction or other known techniques. Therefore, the screen 18 reflects back and "recycles" unused light wavelengths. In FIG. 1, the lamp 10A has the screen 18 mounted inside the reflector housing 14 and the screen 21 mounted at opening 16. The screen 18 and the screen 21 each extends at its periphery to the wall 15.

The screen 21 is a reflecting polarizer that only allows a certain polarity of light to pass through as indicated by the arrows 20. The reflecting polarizer 21 reflects light of unneeded polarity back to the bulb 11. Therefore, in the lamp 10A, emitted light indicated as 20 has been filtered to be of a desired portion(s) of the color spectrum and of a desired polarity.

The screen 21 could be placed towards the bulb 11 adjacent to the screen 18, but as is discussed below in conjunction with FIG. 4, an additional filter may be needed to "clean up" the light emitted from the apparatus from 10A. This is because if the polarized light passed by the screen 21 is allowed to then strike and be reflected by the wall 15, some of that light will then be shifted to the incorrect polarity. Therefore, it is generally preferred to place the screen 21 at a point where the light will not be again reflected within the lamp 10A, though under certain conditions the additional filter could be used.

Figure 2:
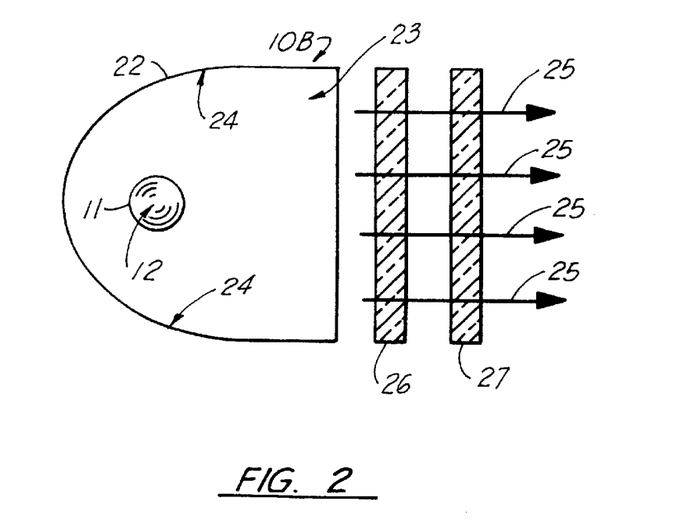
FIG. 2 is a sectional elevational view of a second embodiment of the apparatus of the present invention.

In FIG. 2, a second embodiment is shown, designated generally as 10B. The light apparatus 10B has a bulb 11 with an interior space 12 for containing a fill such as sulfur or selenium or the like. A reflector housing 22 has an open end 23 and an interior surface 24 that can be any of the shapes mentioned above. The surface 24 reflects light emitted by the bulb 11 toward the opening 23 and in the direction of the arrows 25. In the embodiment of FIG. 2, a pair of screens 26, 27 are positioned either externally or covering the opening 23 of the reflector housing 22. In FIG. 2, the screen 26 is an interference filter (e.g., dichroic filter or dichroic mirror) that only passes light of a desired part of the color spectrum (e.g., red, green, blue). The screen 27 is a reflecting polarizer that only passes light of one desired polarity. The screen 26 is preferably positioned to receive the light beam 25 first because interference filters can affect polarity. By positioning the screen 26 to receive light first, there is not as much need later to "clean up" the light path by refiltering for polarity. Therefore, the second screen 27 is preferably the polarizing reflector that only passes one polarity.

Figure 3:
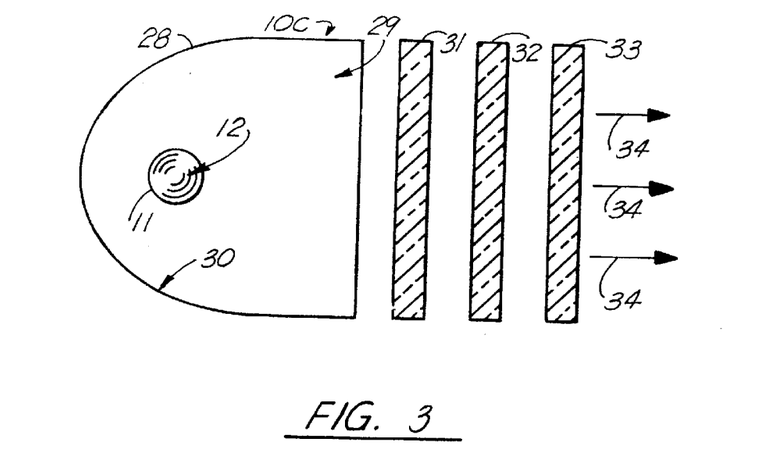
FIG. 3 is a sectional elevational view of a third embodiment of the apparatus of the present invention.

In FIG. 3, a third embodiment of the light apparatus of the present invention is shown, designated as 10C. In FIG. 3, as with the embodiments of FIGS. 1 and 2, the bulb 11 has the interior 12 for containing a fill that can be excited, such as selenium, sulfur, or the like. A hollow reflector housing 28 has an open end 29 and an interior reflecting wall surface 30 that can be parabolic in shape.

Three optical elements 31, 32, 33 are positioned as shown in FIG. 3 externally of housing 28 and either away from or covering the open end 29 portion thereof. The element 31 is a reflecting polarizer that only passes light of one polarity. The element 32 is an interference filter (e.g., dichroic filter or dichroic mirror) that reflects certain wavelengths of the color spectrum while allowing others to pass through.

As with the embodiments of FIGS. 1 and 2, the preferred wavelengths of the color spectrum that will pass through the element 32 are red, green, and blue. The element 33 is a clean-up absorbing filter that corrects polarity so that the emitted light designated by arrows 34 is of a single polarity. This may be used because the element 32 will affect the polarity of the light passed by the element 31.

Figure 4:
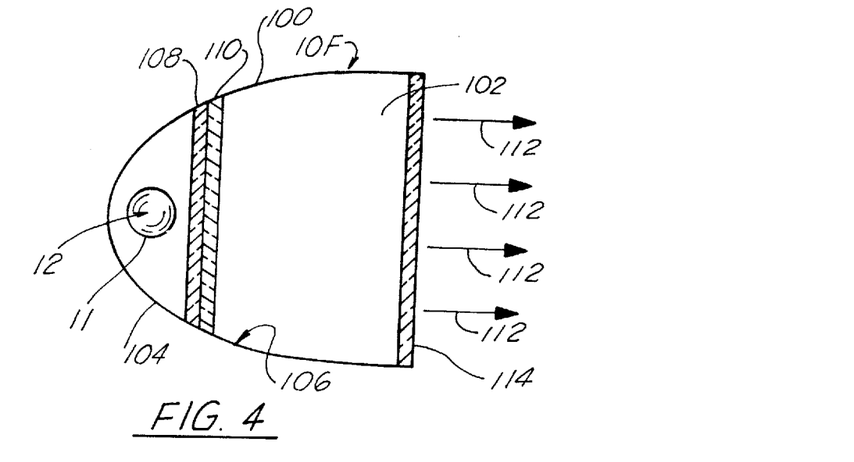
FIG. 4 is a sectional elevational view of a fourth embodiment of the apparatus of the present invention.

A fourth embodiment of the apparatus of the present invention is shown in FIG. 4, designated as 10F. Light apparatus 10F has the bulb 11 with the interior 12 for containing a fill such as sulfur or selenium that can be excited to form a plasma. A reflector housing 100 has an open end 102, an inner reflector surface 106 is formed within a reflective reflector housing 104. A pair of elements 108 and 10 can be the same screen elements as 26 and 27 in FIG. 2. The element 108 is an interference filter (e.g., dichroic filter or dichroic mirror) for only passing certain colors of the light. Element 110 is a reflecting polarizer that only passes one selected polarity of light. Arrows 112 indicate a light emitted by the apparatus 10F as being light of a desired color (such as red, green, and blue) and light that is polarized with a single polarity.

In addition to the elements 108 and 110, however, the apparatus of FIG. 10F may include an additional polarizing filter 114, similar to the element 33 of FIG. 3. When the light passes from the lamp 11 through the interference filter 108 and then the reflecting polarizer 110, it will be of a single polarity. When it reflects off of the reflecting surface 106, the polarity of some of that light will be altered. Therefore, a "clean up" polarizing filter 114 may be provided to ensure that all of the light is of a single polarity. This configuration might be desirable in certain circumstances.

Figure 5:
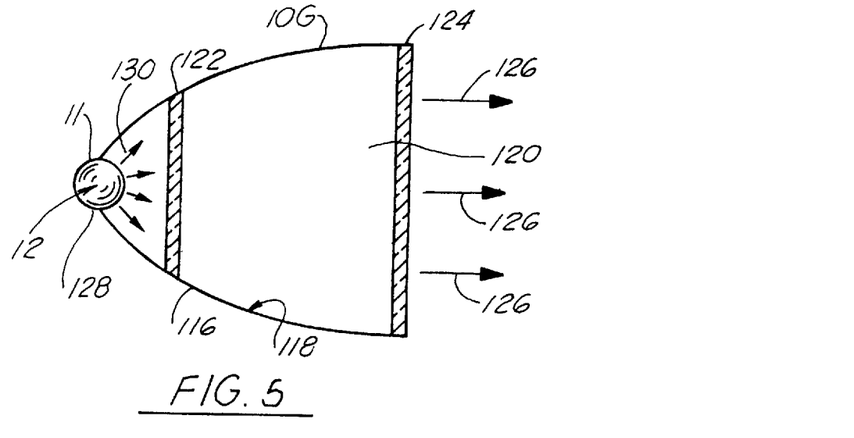
FIG. 5 is a sectional elevational view of a fifth embodiment of the apparatus of the present invention.

A fifth embodiment of the apparatus of the present invention is shown in FIG. 5, designated as 10G. The light apparatus 10G has the bulb 11 with the interior 12 for containing a fill such as sulfur or selenium that can be excited to form a plasma. A reflector housing 116 forms an inner reflecting surface 118 with an open end 120. A pair of elements 122 and 124 can be the same screen elements as 26 and 27 of FIG. 2. The element 122 is an interference filter for only passing certain colors of light. The element 124 is a reflecting polarizer that only passes one selected polarity of light. Arrows 126 indicate a light emitted by the apparatus 10G as being light of a desired color (such as red, green, and blue) and that is polarized with a single polarity. The light apparatus 10G of FIG. 5, however, provides the lamp 11 situated within an opening 128 of the reflective housing 116. Preferably, the lamp 11 includes its own directional aspects, emitting light only in the direction specified by the arrows 130. This could done, for example, by providing a reflective surface on the body of the lamp 11 itself. It will be appreciated the reflective housing 116 and lamp 11 of FIG. 5 could be used in any of the implementations of FIGS. 1–4. In fact, a variety of housing configurations can be used without detracting from the spirit of the invention.

Figure 6:
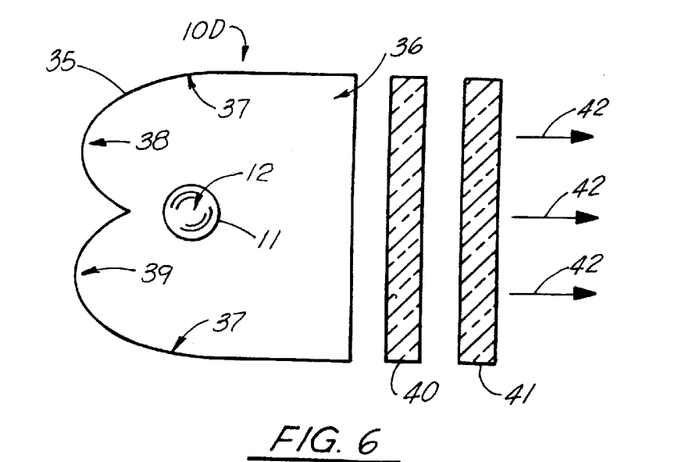
FIG. 6 is a sectional view of the sixth embodiment of the apparatus of the present invention.

A sixth embodiment of the apparatus of the present invention is shown in FIG. 6, designated as 10D. The light apparatus 10D has the bulb 11 with the interior 12 for containing a fill such as sulfur or selenium that can be excited to form a plasma. A reflector housing 35 has an open end 36. An inner reflecting surface 37 has a double parabolic shape in cross section that includes two concavities 38, 39. A pair of elements 40, 41 can be the same screen elements as 26 and 27 in FIG. 2. The element 40 is an interference filter for only passing certain colors of light. The element 41 is a reflecting polarizer that only passes one selected polarity of light. Arrows 42 in FIG. 4 indicate light emitted by the apparatus 10D as being light of a desired color (such as red, green, and blue) and light that is polarized with a single polarity.

Figure 7:
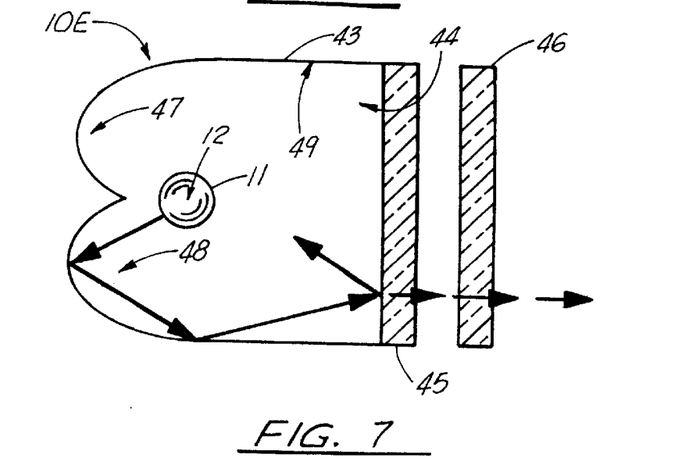
FIG. 7 is a sectional view of the seventh embodiment of the apparatus of the present invention.

In FIG. 7, a seventh embodiment of the apparatus of the present invention is shown designated as 10E. In FIG. 5, the light apparatus 10E has the bulb 11 with the interior 12 for containing a fill that can be excited such as sulfur, selenium, or the like. A hollow annular reflector housing 43 has an opening 44 that is closed with an element 45. A reflecting wall surface 49 of the housing 43 has a pair of concavities 47, 48 in cross section, as shown in FIG. 5. The element 45 forms a closure to the opening 44. An element 46 is spaced therefrom. As with the embodiments of FIGS. 2 and 4, the element 45 can be an interference filter, dichroic filter or dichroic mirror that reflects certain colors of light while allowing others to pass through. The element 46 is preferably a reflecting polarizer that only passes light of one polarity.

Figure 8:
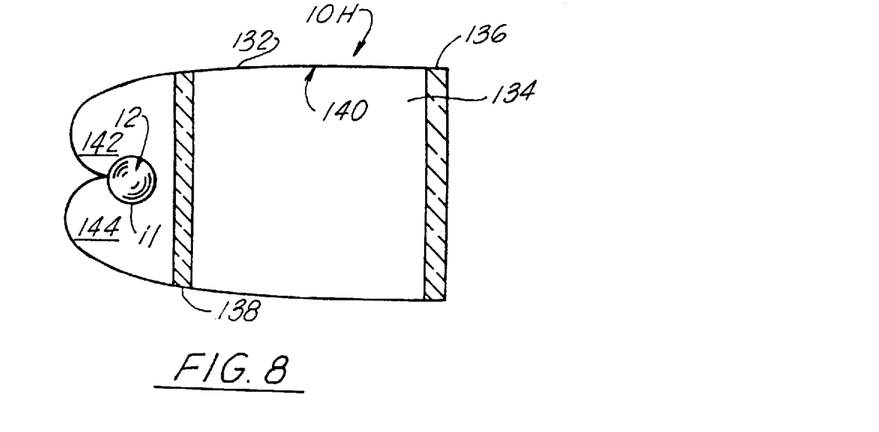
FIG. 8 is a sectional view of the eighth embodiment of the apparatus of the present invention.

An eighth embodiment of the apparatus of the present invention is shown in FIG. 8, designated as 10H. In FIG. 8, the light apparatus 10H again has the bulb 11 with the interior 12 for containing a fill that can be excited such as sulfur, selenium, or the like. Alternately, bulb 11 can be another type of bulb that reabsorbs and reemits light such as a non-mercury metal halide type lamp. A hollow annular reflective housing 132 has an opening 134 closed with an element 136. An element 138 is provided within the reflector housing 132 closer to the lamp 11, and the reflector housing 132 includes a reflecting inner surface 140, as well as to parabolic concavities 142 and 144. As with the embodiment of FIG. 2, the element 138 can be an interference filter that reflects certain colors of light while allowing others to pass through, and the element 136 is preferably a reflecting polarizer that only passes light of one polarity. This configuration corresponds to the single parabolic reflecting configuration of the embodiment of FIG. 1, and it will be appreciated that the same types of reflector positions as discussed in conjunction with FIGS. 1–5 can similarly be implemented within the dual parabolic reflector of FIG. 8.

Further, it will be appreciated that although the various filtering elements of FIGS. 2, 3, 6, and 7 shown spaced from the reflector housings of those Figures, they could also be layered or sandwiched together in contact with those housings.

Therefore, the lamps 10A–10H are more efficient than prior art designs. Substantially all light with unwanted properties, such as spectral or polarization for example, are reflected back into the bulb 11, which reabsorbs the light and reemits it. Ultimately, the only light leaving the lamps 10A–10H is of the desired properties. Thus, by reabsorbing and reemitting the unwanted light, the efficiency of the lamps 10A–10H as measured by the provided power to the desired light, is increased. For all these embodiments, it will again be appreciated that the disclosed techniques can be used with any lamp which can reabsorb and retransmit energy without destroying itself.

Figures 9, 10:
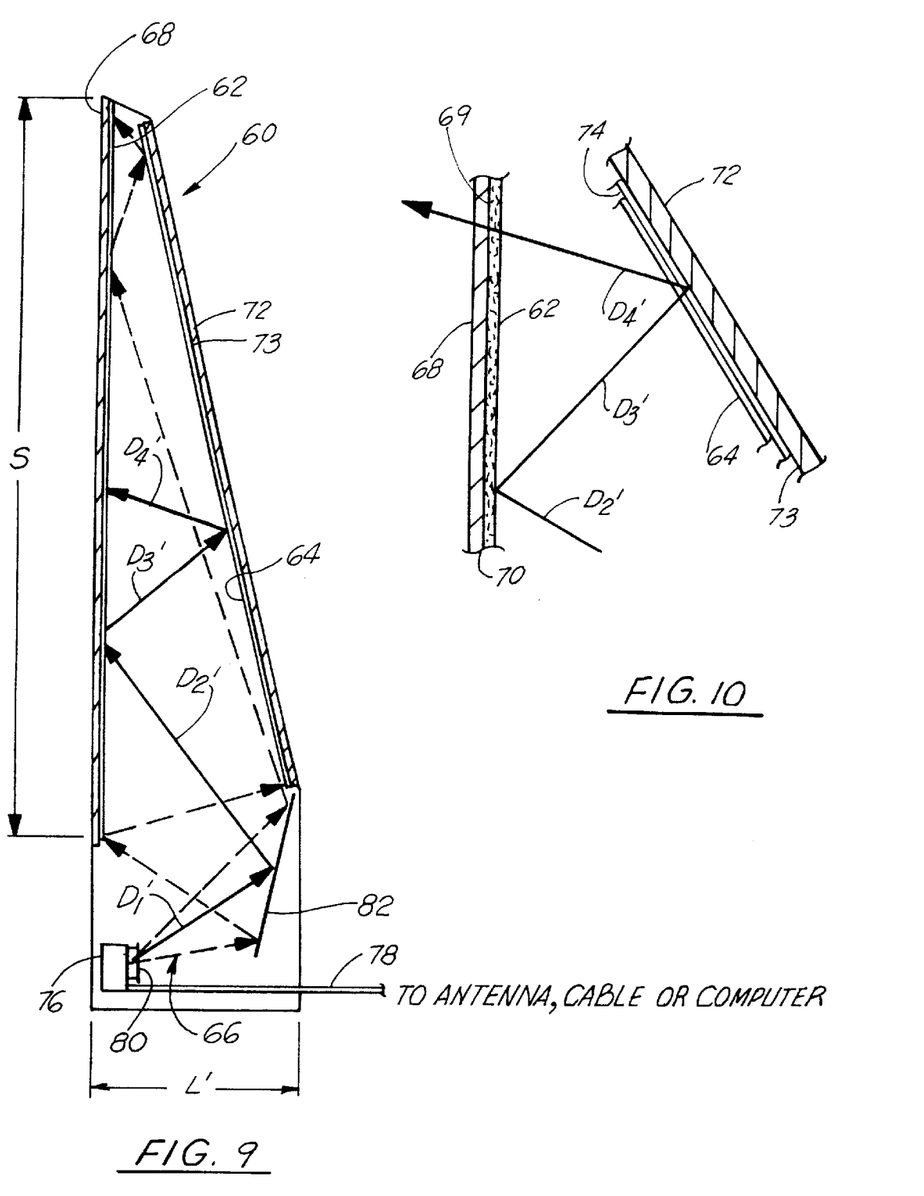
FIGS. 9 and 10 are side views of the preferred embodiment of the apparatus of the present invention showing a rear projection video system.

Referring to FIGS. 9 and 10, another embodiment of the present invention shows a rear projection video system 60 that includes a linear reflecting polarizer 62 and an achromatic retarder 64 that allow light in a projected image 66 to reflect from a display screen 68 at one instance and to pass through the screen 68 at another instance. The linear reflecting polarizer 62 is a linear polarizer that functions like a conventional absorption polarizer, except that it reflects (instead of absorbs) substantially all light that does not pass through it. In other words, the reflecting polarizer 62 may transmit substantially all vertically polarized light waves and reflect substantially all horizontally polarized light waves. The polarizer 62 may be made from any suitable reflecting polarizing material, such as double brightness enhancing film, or "DBEF," material obtained from Minnesota Mining & Manufacturing Company. The linear reflecting polarizer 62 is located immediately behind the screen 68 and may be bonded to the screen 68 by, e.g., an index matching adhesive layer 70. The achromatic retarder 64 is preferably a ¼ wave-length retarder.

An image source 76 in the projection system 60 receives electronic signals through an input cable 78 and converts the signals into a optical image 66. The types of electronic signals used to create the image 66 may include television signals, such as those received by an antenna or over cable lines and processed by a video receiver (not shown), and computer video signals generated by a computer system (not shown). The image source 76 is preferably an image projection engine, such as a liquid crystal display (LCD) projector. With the projection system 60 of the present invention, however, the image source 76 employs one of the high intensity, high efficiency lamps 10 of FIGS. 1–8.

The image source 76 projects the image 66 along a first optical subpath D1' toward a first mirror 82, which in turn reflects the image along a second optical subpath D2' toward the screen 68. Because the light in the image 66 must be horizontally polarized before it reaches the screen 68, the image source 66 must produce polarized light (as in the case of lamps 10A, 10B, 10C, 10D, 10E, 10F, 10G, or 10H). Alternatively, a substantially conventional projection engine can be used. If so, a conventional linear polarizing filter 80 must be placed across one of the optical subpaths D1', D2' between the image source 76 and the screen 68. If the polarizing filter 80 is placed in the optical path before the first mirror 82, a second polarizing filter (not shown) may be placed near the first mirror 82 along subpath D2' to filter stray light distortions caused by the reflection at the first mirror 82.

As the horizontally polarized light in the image approaches the screen 68, it encounters the linear reflecting polarizer 62. Because the light is horizontally polarized, the reflecting polarizer 62 reflects substantially all of the light in the image 66 away from the screen 68 and toward the second mirror 72 along optical subpath D3'.

As the light approaches the second mirror 72, it passes through the ¼ wavelength achromatic retarder 64. The light then reflects from the second mirror 72 and travels along optical path D4' back toward the screen 68. Before reaching the screen 68, the light again passes through the ¼ achromatic retarder 64, which rotates the polarization angle of the light again, so that the light is now vertically polarized.

When the light, now vertically polarized, encounters the linear reflecting polarizer 62 for a second time, the polarizer 62 transmits the light onto a rear surface 69 of the imaging screen 68. In effect, for every image the screen 68, including the reflecting polarizer 62, acts at one time as a mirror and at another time as a rear projection imaging screen. This allows the projection system 60, which has a relatively long optical path (D1'+D2'+D3'+D4'). A linear absorption polarizer (not shown) may be placed between the reflecting polarizer 62 and the screen 68 to filter any stray light distortions that may result from reflections in the system.

The lamps 10A–10H are preferably used in the projection system 60 to increase the efficiency of the projection system 60 due to the increased efficiency of the lamps 10A–10H

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of increasing the efficiency of a light source, comprising:

producing a light beam with a light source having a fill, the light beam comprising usable and unusable portions;

redirecting some of the unusable portions back to the light source to be reabsorbed by the fill;

directing the usable portions to leave the light source; and powering the light source by electrodes external to the light source.

2. The method of claim 1, wherein the fill comprises one of sulfur, selenium, and metal halide.

3. A method of increasing the efficiency of a light source, comprising:

producing a light beam with a light source having a fill, wherein the light source includes a sealed bulb having a fill, the light beam comprising usable and unusable portions, and wherein the producing comprises exciting the fill to form a plasma;

redirecting some of the unusable portions back to the light source to be reabsorbed by the plasma and directing the usable portions to leave the light source; and powering the light source by electrodes external to the light source.

4. A method of increasing the efficiency of a light source, comprising:

producing a light beam with a light source having a fill, the light beam comprising usable and unusable portions;

redirecting some of the unusable portions back to the light source to be reabsorbed;

directing the usable portions to leave the light source;

powering the light source by electrodes external to the light source; and filtering the emitted light to form a light beam of polarized light.

5. A method of increasing the efficiency of a light source, comprising:

producing a light beam with a light source having a fill, the light beam comprising usable and unusable portions;

redirecting some of the unusable portions back to the light source to be reabsorbed, wherein the redirecting comprises positioning a polarizing reflector to receive a beam of light from the light source, and wherein the polarizing reflector passes light of one polarity and reflects other light back to the light source;

directing the usable portions to leave the light source; and powering the light source by electrodes external to the light source.

6. The method of claim 1 further comprising filtering the beam of light with a reflecting filter.

7. The method of claim 6, wherein the reflecting filter is an interference filter.

8. The method of claim 6, wherein the reflecting filter is a dichroic filter.

9. The method of claim 6, wherein the reflecting filter passes red, blue, and green light.

10. A method of increasing the efficiency of a light source, comprising:
   producing a light beam with a light source having a fill, the light beam comprising usable and unusable portions;
   redirecting some of the unusable portions back to the light source to be reabsorbed, wherein the redirecting comprises positioning a polarizing reflector to receive a beam of light from the light source, and wherein the polarizing reflector passes light of one polarity and reflects other light back to the light source;
   directing the usable portions to leave the light source;
   powering the light source by electrodes external to the light source; and
   filtering the beam of light with a reflecting filter.

11. The method of claim 10, wherein the reflecting filter is an interference filter.

12. The method of claim 10, wherein the reflecting filter is a dichroic filter.

13. The method of claim 10, wherein the reflecting filter passes red, blue, and green light.

14. A high efficiency lamp apparatus for producing a light beam, comprising:
   a lamp that defines a chamber, wherein the lamp emits a light beam having both usable and unusable portions;
   a fill disposed inside the lamp;
   electrodes external to the lamp and adapted to generate a plasma from the fill; and
   a reflector positioned to redirect some of the unusable light back to the lamp to reabsorb light energy by the plasma and to pass a portion of the usable light.

15. A high efficiency lamp apparatus for producing a light beam, comprising:
   a lamp that defines a chamber, wherein the lamp emits a light beam having both usable and unusable portions;
   a reflector positioned to redirect a portion of the unusable light back to the lamp to reabsorb light energy and to pass a portion of the usable light, wherein the reflector includes a polarizing filter that is positioned to receive and polarize the light beam;
   a fill disposed inside the lamp; and
   electrodes external to the lamp and adapted to generate a plasma from the fill.

16. The lamp apparatus of claim 15, wherein the polarizing filter passes light of one polarity and reflects light of another polarity.

17. The lamp apparatus of claim 16 further comprising an absorbing filter for correcting polarity of light emitted from the polarizing filter.

18. The lamp apparatus of claim 14, wherein the fill includes one of: selenium, metal halide, and sulfur.

19. The lamp apparatus of claim 14, wherein the lamp includes a bulb.

20. The lamp apparatus of claim 14 further comprising a filter positioned to reflect the unusable light and to pass only light of selected portions of the color spectrum.

21. A high efficiency lamp apparatus for producing a light beam, comprising:
   a lamp that defines a chamber, wherein the lamp emits a light beam having both usable and unusable portions;
   a reflector positioned to redirect a portion of the unusable light back to the lamp to reabsorb light energy and to pass a portion of the usable light;
   an interference filter that reflects light other than red, green, and blue light, the interference filter being located in the beam;
   a fill disposed inside the lamp; and
   electrodes external to the lamp and adapted to generate a plasma from the fill.

22. The lamp apparatus of claim 14, wherein the reflector is a shaped reflector that extends about the majority of the outer surface of the lamp body.

23. A high efficiency lamp apparatus for producing a light beam, comprising:
   a lamp that defines a chamber, wherein the lamp emits a light beam having both usable and unusable portions;
   a reflector positioned to redirect a portion of the unusable light back to the lamp to reabsorb light energy and to pass a portion of the usable light, wherein the reflector is a shaped reflector that extends about the majority of the outer surface of the lamp body, and wherein the reflector has a wall that is positioned about the lamp body and including an opening at one end of the reflector wall through which a light beam can travel;
   a fill disposed inside the lamp; and
   electrodes external to the lamp and adapted to generate a plasma from the fill.

24. The lamp apparatus of claim 23, wherein a polarizing filter is positioned across the opening.

25. The lamp apparatus of claim 23 further comprising an interference filter positioned across the opening.

26. The lamp apparatus of claim 23 further comprising a dichroic filter positioned across the opening.

27. A method of displaying an optical image comprising:
   generating a light beam by powering a lamp through electrodes external to the lamp, the light beam comprising usable and unusable portions;
   redirecting some of the unusable portions of the light beam back to the lamp to reabsorb light energy and passing the usable portions of the light beam;
   using the redirected light to increase the efficiency of the lamp; and
   using the usable portions of the light beam to form an image projected at a display surface.

28. The method of claim 27 further comprising:
   reflecting a first portion of the image from an optical device; and
   permitting a second portion of the image to pass through the optical device.

29. The method of claim 28, wherein the optical device is essentially parallel to the display surface.

30. The method of claim 28, wherein the optical device is near the display surface.

31. The method of claim 28, wherein the optical device is attached to the display surface.

32. The method of claim 28, wherein the display surface is on a video viewing screen.

33. The method of claim 28 further comprising reflecting the image at least once more.

34. The method of claim 28 further comprising reflecting the image twice more.

35. The method of claim 28, wherein reflecting from the optical device is done before permitting the image to pass through the optical device.

36. The method of claim 28 further comprising delivering the image to the optical device polarized in one direction at one time and polarized in a different direction at another time.

37. The method of claim 28 further comprising, prior to a time when the image is passed through the optical device, rotating a polarization of the image at least once.

38. The method of claim 28 further comprising, prior to a time when the image is passed through the optical device, twice rotating a polarization of the image.

39. The method of claim 28 further comprising passing the image through at least one linear absorption polarizer.

40. A projection apparatus for producing an image display comprising:

an image source that includes a lamp that is comprised of a lamp body with a chamber, wherein the lamp is for emitting a beam having both usable and unusable portions of light;

a reflector positioned for redirecting some of the unusable light back to the lamp so that the lamp reabsorbs light energy to increase efficiency;

a display surface; and the image source generating an image from the usable portions of the light in the beam that travels an image path which reaches the display surface,     wherein the reflector is positioned for redirecting some of the unusable light in the beam back to the lamp before the beam is used by the image source for generating an image.

41. The apparatus of claim 40, wherein the lamp chamber includes a fill, the apparatus further comprising external electrodes for exciting the fill.

42. The lamp apparatus of claim 41, wherein the fill is one of: sulfur, selenium, or a metal halide.

43. The lamp apparatus of claim 40 further comprising an interference filter that only passes light of selected portions of the color spectrum, the interference filter being located in the optical path of the beam.

44. The lamp apparatus of claim 43, wherein the interference filter that passes only red, green, and blue light.

45. The lamp apparatus of claim 40 further comprising a dichroic filter that only passes light of selected portions of the color spectrum, the dichroic filter being located in the optical path of the beam.

46. The lamp apparatus of claim 40, wherein the reflector includes a reflector body positioned next to the lamp body and a reflecting filter that reflects some light and allows other light to pass therethrough.

47. The lamp apparatus of claim 46, wherein the reflector body does not pass light emitted from the light source, and the reflecting filter passes only polarized light.

48. The lamp apparatus of claim 47 further comprising an absorbing filter for correcting polarity of light emitted from the reflecting filter.

49. The lamp apparatus of claim 46, wherein the shaped reflector body extends about the majority of the outer surface of the lamp body.

50. The lamp apparatus of claim 49, wherein the reflector body has a wall that is positioned about the lamp body and includes an opening at one end of the reflector wall through which the beam can travel.

51. The lamp apparatus of claim 50, wherein the reflecting filter is positioned across the opening.

52. The lamp apparatus of claim 51 further comprising an interference filter positioned across the opening.

53. The lamp apparatus of claim 51 further comprising a dichroic filter positioned across the opening.

54. The projection apparatus of claim 40, wherein the reflector comprises a linear reflecting polarizer.

55. The projection of claim 40, wherein the reflector comprises double brightness enhancing film.

\* \* \* \* \*